Patented Mar. 19, 1929.

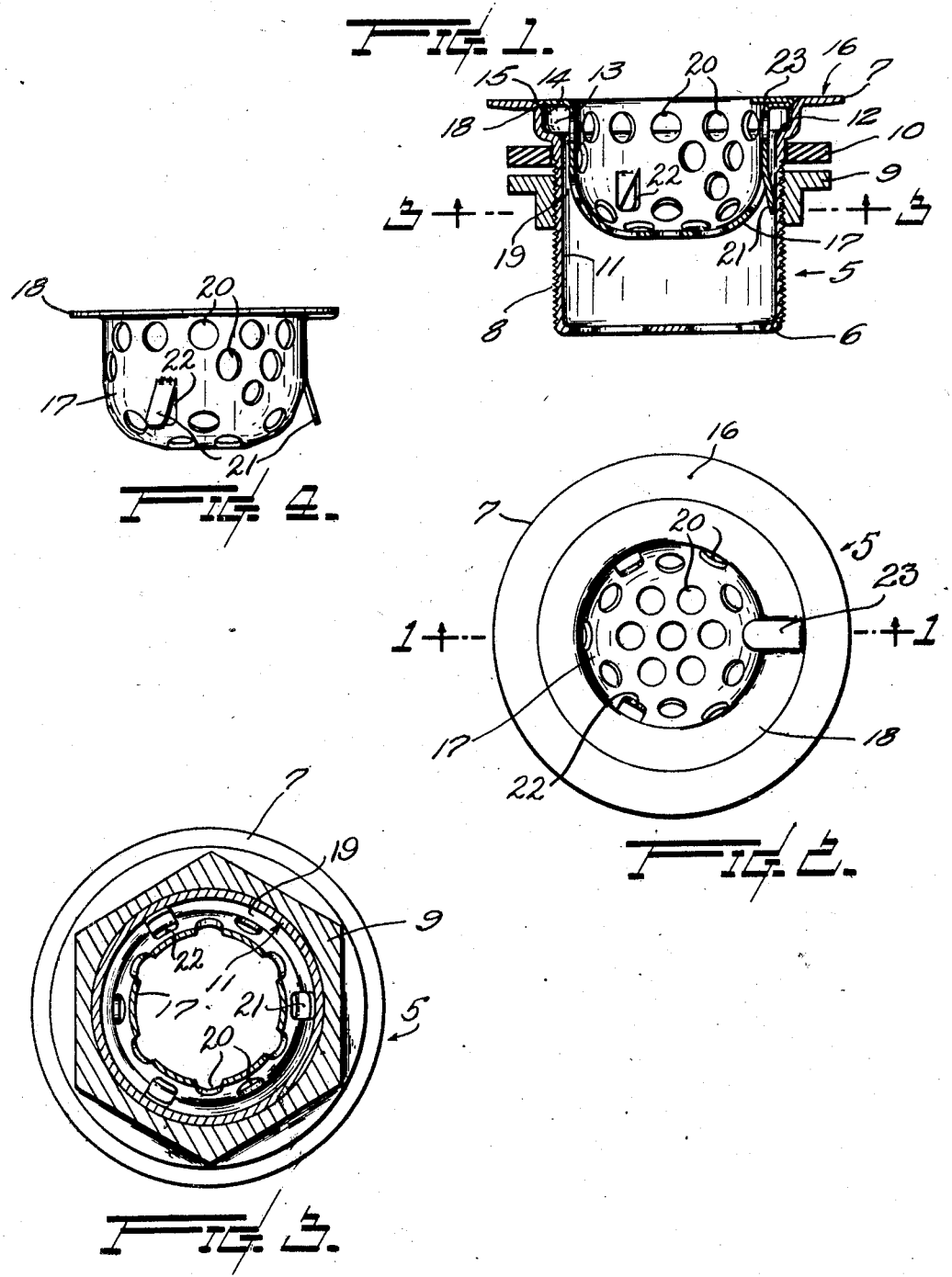

1,706,000

UNITED STATES PATENT OFFICE.

SIMON G. SETTLES, OF SEATTLE, WASHINGTON, ASSIGNOR TO ARGO MANUFACTURING CO., OF SEATTLE, WASHINGTON, A CORPORATION OF WASHINGTON.

SINK STRAINER.

Application filed December 14, 1927. Serial No. 239,838.

This invention relates to a kitchen sink strainer; and its object is the provision of a substantially basket shaped sink strainer which is adapted to receive the refuse or garbage and be conveniently removed from the sink for dumping the collected garbage.

Another object of the invention is the provision of a strainer of this kind which is designed for use with the tubular fitting which is commonly used for coupling a sink with its waste pipe and provide ample drainage space which will not become clogged by garbage collected in the strainer.

Another object of the invention is the provision of a removable strainer of simple and inexpensive construction which is arranged to be conveniently inserted or removed from the sink outlet without the use of a bail or the like.

Other specific objects and advantages of the invention will appear in the following description.

The invention consists in the novel construction and adaptation of devices as will be hereinafter described and claimed.

In the accompanying drawing,—

Figure 1 is a transverse vertical section of a waste pipe coupling for a kitchen sink and a strainer embodying my invention applied thereto, said section being taken on line 1—1 of Fig. 2. Fig. 2 is a plan view of Fig. 1. Fig. 3 is a horizontal section on line 3—3 of Fig. 1, looking upwardly. Fig. 4 is an elevational view of the strainer shown detached.

In said drawing the reference numeral 5 represents a kitchen-sink fitting with tubular body portion 6 having about its upper edge a peripheral flange 7 which seats in a recess provided therefor in the bottom of a sink, not shown.

The tubular body 6 of said fitting is provided with an external screw thread 8 to receive a nut 9 which acts through the medium of a gasket 10 and coacts with the flange 7 to clamp the fitting to the sink. The screw thread 8 also serves to receive a union nut for coupling the fitting to a waste pipe as usual.

Said tubular body is formed with a smooth peripheral wall 11, usually below an annular shelf 12, above which the opening is enlarged, as at 13, and the peripheral surface 14 is connected by a rounded shoulder 15 with the upper surface 16 of the flange 7.

The above described outlet fitting for a sink is not new.

According to the present invention I provide a basket-like removable strainer for the inlet or upper end of said fitting. This strainer, shown detached in Fig. 4, comprises a lower portion 17 which I term the basket with a peripheral flange or brim 18 about its upper edge. Said brim is flat and of an external diameter to seat upon the shoulder 15 of the fitting to support the basket and have the upper surface of the brim flush or in a plane with the upper surface 16 of the flange 7.

The basket 17 is of a diameter less than the internal diameter of the tubular body portion 6 below the shoulder 12 and hence affords an annular space 19 within the fitting for the entire depth of the basket.

The basket is provided with a plurality of perforations 20 disposed from within close proximity of the brim to and in the bottom of the basket.

Said basket is also provided in its lower portion with a plurality of tongues 21, preferably three, which are spaced equal distances apart circumferentially of the basket and are offset from the latter to span the space 19 and into contact with the peripheral wall 11 of the fitting 5.

Said tongues are, in practice, struck out from the material of the basket wall and thus provide therein perforations 22 supplementary to those indicated by 19.

Provided at the top of the basket is an inwardly directed lug 23 which is adapted to be engaged by the thumb or a finger of the operator for lifting the strainer to remove the same. In practice the lug 23 is formed by the provision of a radially extending projection of the brim as is turned back over the brim as shown in Figs. 1 and 2 to provide a thumb or finger hold extending inwardly of the basket.

The operation and advantages of the invention will be understood from the foregoing description.

What I claim, is,—

In combination with a sink fitting, wherein the fitting comprises an annular wall and perforated bottom and an annular outwardly directed flange at its upper end, and wherein an annular seat is formed on the fitting at the bend between the annular wall and flange, a strainer basket perforated over its entire area and to be removably supported in the fitting, said basket having an outwardly directed annular flange at its upper end resting on the seat at the upper end of the fitting, the basket and fitting flanges lying in the same plane, a finger piece projecting from the edge of the basket flange and reversely bent to overlie the flange and fingers struck out from the side wall of the basket intermediate the upper and lower ends thereof to engage the side walls of the fitting to space the basket therefrom.

Signed at Seattle, Washington, this 9th day of December, 1927.

SIMON G. SETTLES.